US008059128B1

(12) United States Patent
Legakis et al.

(10) Patent No.: US 8,059,128 B1
(45) Date of Patent: Nov. 15, 2011

(54) APPARATUS AND METHOD FOR PERFORMING BLIT OPERATIONS ACROSS PARALLEL PROCESSORS

(75) Inventors: Justin S. Legakis, Sunnyvale, CA (US); Mark J. French, Raleigh, NC (US); Steven E. Molnar, Chapel Hill, NC (US); Lukito Muliadi, San Jose, CA (US)

(73) Assignee: Nvidia Corporation, Santa Clara, CA (US)

( * ) Notice: Subject to any disclaimer, the term of this patent is extended or adjusted under 35 U.S.C. 154(b) by 756 days.

(21) Appl. No.: 11/407,464

(22) Filed: Apr. 19, 2006

(51) Int. Cl.
*G06F 15/80* (2006.01)
*G06F 21/00* (2006.01)

(52) U.S. Cl. ......... 345/505; 345/530; 345/543; 711/168

(58) Field of Classification Search ................. 345/505, 345/506, 543, 573, 530; 711/149, 168; 712/32
See application file for complete search history.

(56) References Cited

U.S. PATENT DOCUMENTS

| | | | | | |
|---|---|---|---|---|---|
| 4,930,066 | A * | 5/1990 | Yokota | ........................ | 711/149 |
| 5,408,629 | A * | 4/1995 | Tsuchiva et al. | .............. | 711/151 |
| 5,434,967 | A * | 7/1995 | Tannenbaum et al. | ........ | 345/506 |
| 5,861,894 | A * | 1/1999 | Sotheran et al. | .............. | 345/573 |
| 5,978,830 | A * | 11/1999 | Nakaya et al. | ................ | 718/102 |
| 6,289,434 | B1 * | 9/2001 | Roy | ................................ | 712/32 |
| 7,508,397 | B1 * | 3/2009 | Molnar et al. | ................ | 345/562 |
| 2003/0197707 | A1 * | 10/2003 | Dawson | ........................ | 345/543 |

* cited by examiner

*Primary Examiner* — Amare Mengistu
*Assistant Examiner* — Aaron M Guertin
(74) *Attorney, Agent, or Firm* — Cooley LLP

(57) ABSTRACT

A method of performing a blit operation in a parallel processing system includes dividing a blit operation into batches of pixels, performing reads of pixels associated with a first batch in any order, confirming that all reads of pixels associated with the first batch are completed, and performing writes of pixels associated with the first batch in any order. The pixels of the first batch and pixels of additional batches are applied to parallel processors, where the parallel processors include a corral defined by entry points and exit points distributed across the parallel processors.

5 Claims, 6 Drawing Sheets

APPARATUS AND METHOD FOR PERFORMING BLIT OPERATIONS ACROSS PARALLEL PROCESSORS

BRIEF DESCRIPTION OF THE INVENTION

This invention relates generally to graphics processing. More particularly, this invention relates to a technique for performing blit operations across parallel processors of a graphics processing unit (GPU).

BACKGROUND OF THE INVENTION

In conventional graphics processing systems, an object to be displayed is typically represented as a set of one or more graphics primitives. Examples of graphics primitives include one-dimensional graphics primitives, such as lines, and two-dimensional graphics primitives, such as polygons. Portions of an object to be displayed are frequently moved from one display location to another. This copying of a source pixel area to a destination pixel area is referred to as a blit operation. A GPU may respond to an instruction to perform a blit operation by performing a read operation to read data in memory locations corresponding to the source pixel area, followed by a write operation to write the data to memory locations corresponding to the destination pixel area. The instruction for a blit operation may specify coordinates to identify the source pixel area, as well as coordinates to identify the location of the destination pixel area.

Within a single blit, if the destination pixel area overlaps the source pixel area, the reads and writes need to be performed with attention to ordering so that reads for pixels that are both in the source and destination pixel area are performed before the destination writes. This is the traditional blit correctness problem. There are known techniques for solving this problem in serial processing systems. It would be desirable to solve this problem in a parallel processing system.

Performance demands are resulting in increased parallel processing in GPUs. Parallel processing raises particular challenges for blit operations. Efficient parallel processing requires out of order execution of operations whenever possible. However, out of order execution of blit operations may result in the reading of stale data and the overwriting of valid data.

It would be desirable to extend the performance benefits of parallel processing to blit operations. However, any such parallel processing of blit operations must preserve data integrity. That is, any such parallel processing of blit operations must be accomplished without incurring errors in the sequencing of read and write operations.

SUMMARY OF THE INVENTION

The invention includes a method of performing a blit operation in a parallel processing system. The method includes dividing a blit operation into batches of pixels, performing reads of pixels associated with a first batch in any order, confirming that all reads of pixels associated with the first batch are completed, and performing writes of pixels associated with the first batch in any order. The pixels of the first batch and pixels of additional batches are applied to parallel processors, where the parallel processors include a corral defined by entry points and exit points distributed across the parallel processors.

The invention also includes a method of processing graphics information. The method includes dividing pixels associated with a blit operation into a first batch and a second batch, delivering pixels of the first batch and the second batch to processing units of a set of processing units, where the processing units include a corral defined by entry points and exit points distributed across the processing units. The method identifies when all of the pixels of the first batch have been delivered to the corral and the pixels of the first batch are then removed.

The invention also includes a graphics processing unit with a set of processing units. A circuit divides pixels associated with a blit operation into batches of pixels. A circuit delivers pixels of each batch to processing units of the set of processing units, where the set of processing units include a corral defined by entry points and exit points distributed across the processing units. The corral contains at least one batch of pixels. All batches within a blit pass through the corral.

BRIEF DESCRIPTION OF THE FIGURES

The invention is more fully appreciated in connection with the following detailed description taken in conjunction with the accompanying drawings, in which.

Like reference numerals refer to corresponding parts throughout the several views of the drawings.

DETAILED DESCRIPTION OF THE INVENTION

Figure 1:
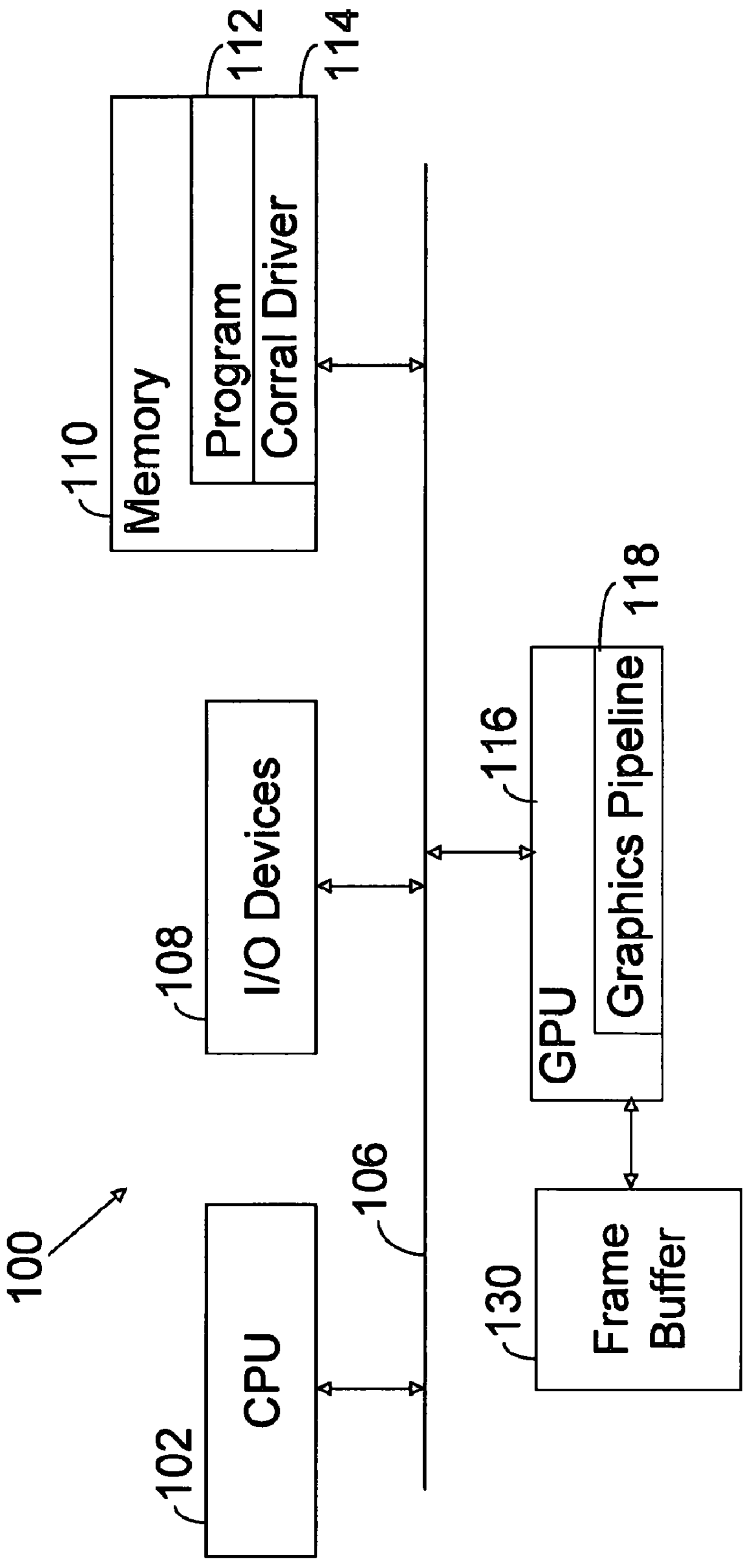
FIG. 1 illustrates a system configured in accordance with an embodiment of the invention.

FIG. 1 illustrates a system 100 configured in accordance with an embodiment of the invention. The system 100 includes a central processing unit 102 connected to a set of input/output devices 108 via a bus 106. The input/output devices 108 include standard components, such as a mouse, a keyboard, a display, a printer, and the like. Also connected to the bus 106 is a memory 110. The memory 110 includes a program 112, which has graphics data processed in accordance with the invention. The memory 110 also stores a corral driver 114 with executable instructions to specify a batch size for processing in accordance with an embodiment of the invention. The corral driver 114 may also be configured to enable and disable corral processing operations associated with the invention.

FIG. 1 also illustrates a GPU 116 connected to the bus 106. The GPU 116 communicates with an associated frame buffer 130. The GPU 116 includes a graphics pipeline 118. The graphics pipeline 118 may be implemented with any number of pipeline stages, including a transform stage, a lighting stage, and a raster stage. One embodiment of the invention is directed toward parallel processors of the graphics pipeline 118. In particular, one embodiment of the invention utilizes parallel processors of the graphics pipeline to perform blit operations. In accordance with the invention, the read and write operations associated with a blit operation may be performed asynchronously within a group, while still maintaining data integrity. The components of FIG. 1 may be arranged in any number of ways, including integrating one or more components of FIG. 1 into a single chip. For example, the GPU 116 may be embedded with a memory.

Figure 2:
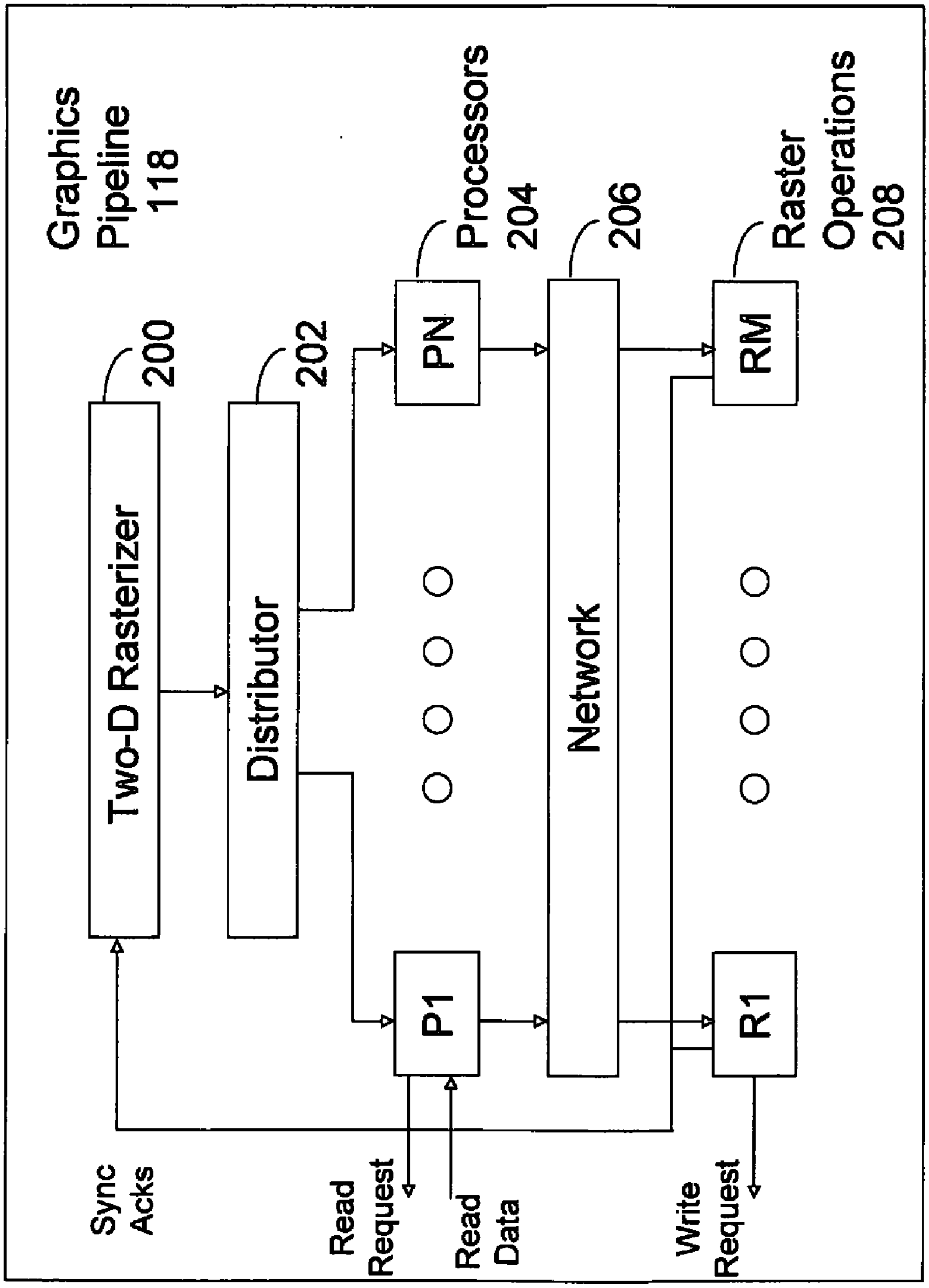
FIG. 2 illustrates a portion of a graphics pipeline circuitry utilized in accordance with an embodiment of the invention.

FIG. 2 illustrates a portion of a graphics pipeline 118 that may be utilized in accordance with an embodiment of the invention. The graphics pipeline 118 includes a two-dimensional rasterizer 200, which delivers graphics data to a distributor circuit 202. For example, the two-dimensional rasterizer 200 sends control signals, such as coordinates identifying source and destination pixel areas, to the distributor 202. The source and destination pixel areas specify a set of pixels (e.g., defining a rectangular area) to be processed. The distributor 202 delivers this information to the parallel processors 204, including processors P1 through PN. Each processor P may include a texture processing unit.

The parallel processors P1 through PN carry out blit operations in parallel. Each processor P operates to read data from a memory location in the frame buffer 130. In particular, as shown with processor P1, read requests are applied to the frame buffer 130 and read data is returned. The memory location specified in the read request corresponds to a specified source pixel area. The output from the individual processors P1 through PN is transferred via network 206 to raster operations 208, including raster operations units R1 through RM. The network may be a sophisticated routing network, if there is a general mapping of pixel data from processors P1 through PN to raster operations units, or it may be as simple as a direct connection between processors P1 through PN and dedicated raster operations units. The raster operations units 208 write the appropriate data to the memory locations in the frame buffer 130 corresponding to the specified destination pixel area to complete the blit operation. The raster operations units 208 communicate with the two-dimensional rasterizer 200 in a closed-loop to indicate that the blit operation is completed.

In accordance with the invention, the graphics pipeline 118 is configured to process groups or batches of input data (e.g., pixels). The ordering of the batches is significant. The ordering constraints are the same as in a serial system. For example, if a blit copies a rectangle one pixel to the left, batches would start at the left edge of the rectangle and move to the right. Pixels that are both read and written are read in an earlier (or the same) batch than the batch that writes them. The graphics pipeline 118 reads pixels within a batch before any writes associated with the batch are performed. More particularly, the writes for any batch N must not be performed until the reads for all batches 1 through N are completed. As long as this condition is observed, the reads and writes associated with a blit operation within a batch may be performed in any order. This specified ordering of reads and writes insures data integrity, while allowing for asynchronous reads and writes within a batch, which facilitates exploitation of the parallel processor architecture.

As in prior art systems, the invention processes a blit in batches. However, the pixels in a batch may be read at different times by different parallel processors and processed by different parallel processors and written at different times on different parallel processors. The pixel data in a batch need not be collected together on any single processor. The invention provides a "blit corral" that may be distributed over the processors to preserve the integrity of the blit without requiring the data of a batch to be gathered into a single processor. The corral is a stationary logical structure that allows one to observe what pixels have entered the corral and provides a gate to prevent them from leaving prematurely. The corral is defined by entry points and exits points distributed across the processing units. The size of the corral is configurable, but is always configured to be large enough to contain at least one batch of pixels.

The blit input data is divided into batches of pixels that may be viewed as subsets of the blit input data. For example, in the case of a rectangular blit, a number of batches may be formed as sub-rectangles of the rectangular blit. One rule for dividing a blit into batches is: if it would be correct to process the batches in order serially, then it will also be correct to process those same batches in that same order using the blit corral algorithm. Advantageously, the read operations may be performed in parallel to improve processing speed. The write operations associated with a batch may also occur in any order. As discussed below, the batches of the invention may be implemented with hardware control that guarantees that all read operations occur before write operations.

Figure 3:
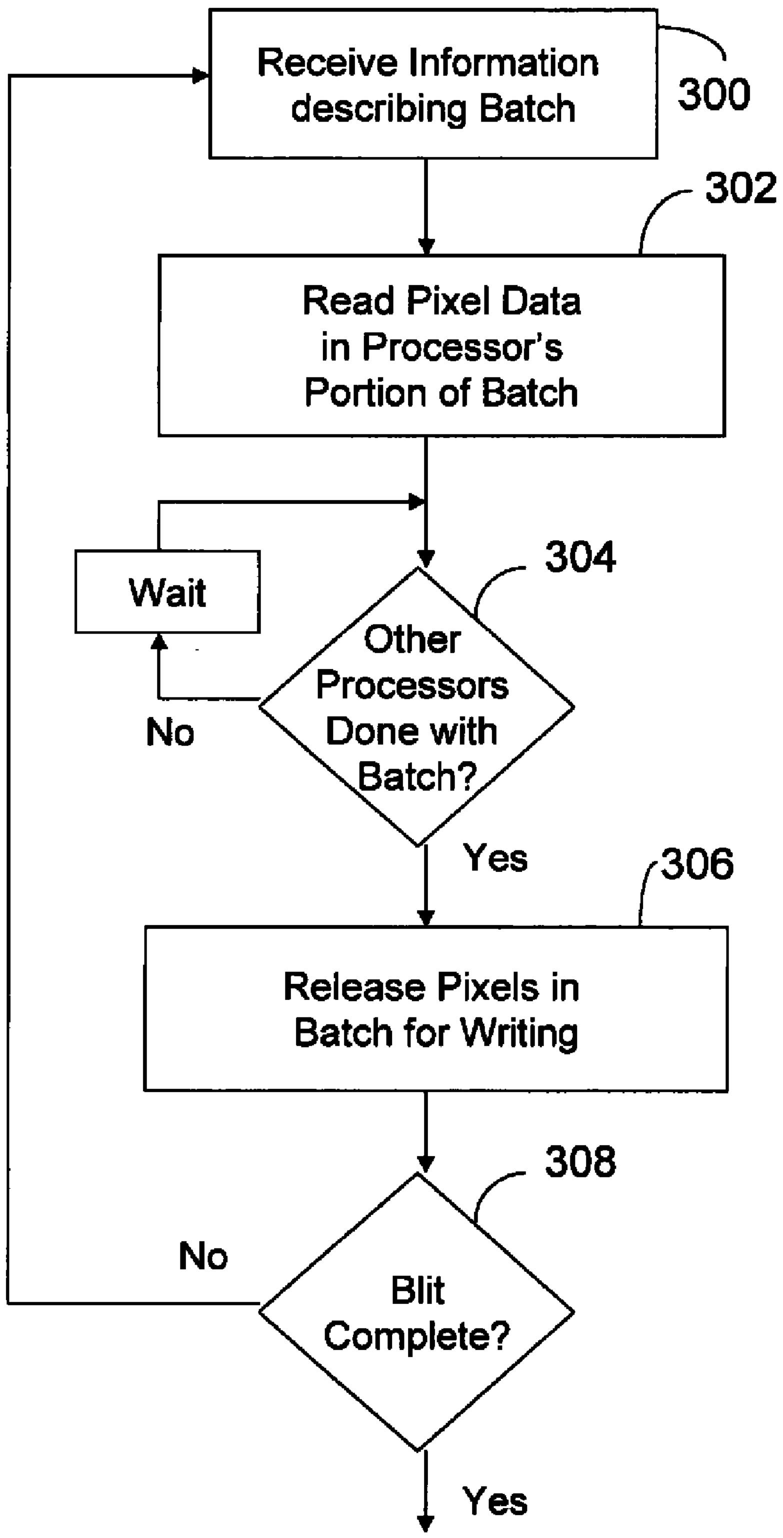
FIG. 3 illustrates processing operations associated with an embodiment of the invention.

The foregoing operations of the invention are more fully appreciated with reference to FIG. 3, which illustrates the operations performed by one of the parallel processors 204 in an embodiment of the invention. The first processing operation of FIG. 3 is to receive information describing the batch 300 from two-dimensional rasterizer 200 and the distributor circuit 202. The information specifies the location of pixels to be read by the processor. Again, a batch is a group of input data with a specified size (e.g., a specified number of pixels). The corral driver 114 may be used to specify the batch size.

The second operation is to read pixel data in the processor's portion of the batch 302. Within a batch, pixels may be read in any order. Once read, the pixel data has now entered the blit corral. The processor then determines whether the other parallel processors 204 have completed their reads of the batch 304. This may be done via control signals between the parallel processors 204 or by a central controller, which gathers and distributes status signals from each of the parallel processors 204. If any other processor is still reading data for the batch, the processor must wait. Once the batch is complete on all parallel processors 204, the processor may release pixels for the batch for writing 306. This operation effectively unloads one batch from the corral.

The network 206 may receive the pixels from the corral and deliver them to the raster operations units 208. The raster operations units 208 may then write the pixels to memory locations within the frame buffer 130 in any desired sequence. A new batch is then invoked 308 and the processing beginning at block 300 is repeated. It should be appreciated that blocks 300 and 302 are running continuously. There may be several batches in the pipeline or corral at any one time. The completion of a batch does not stop blocks 300 and 302; similarly, blocks 300 and 302 do not need to wait for block 308. Rather, continuous processing in a parallel processing system is being performed, which is not otherwise immediately apparent from the flow chart of FIG. 3.

Figure 4:
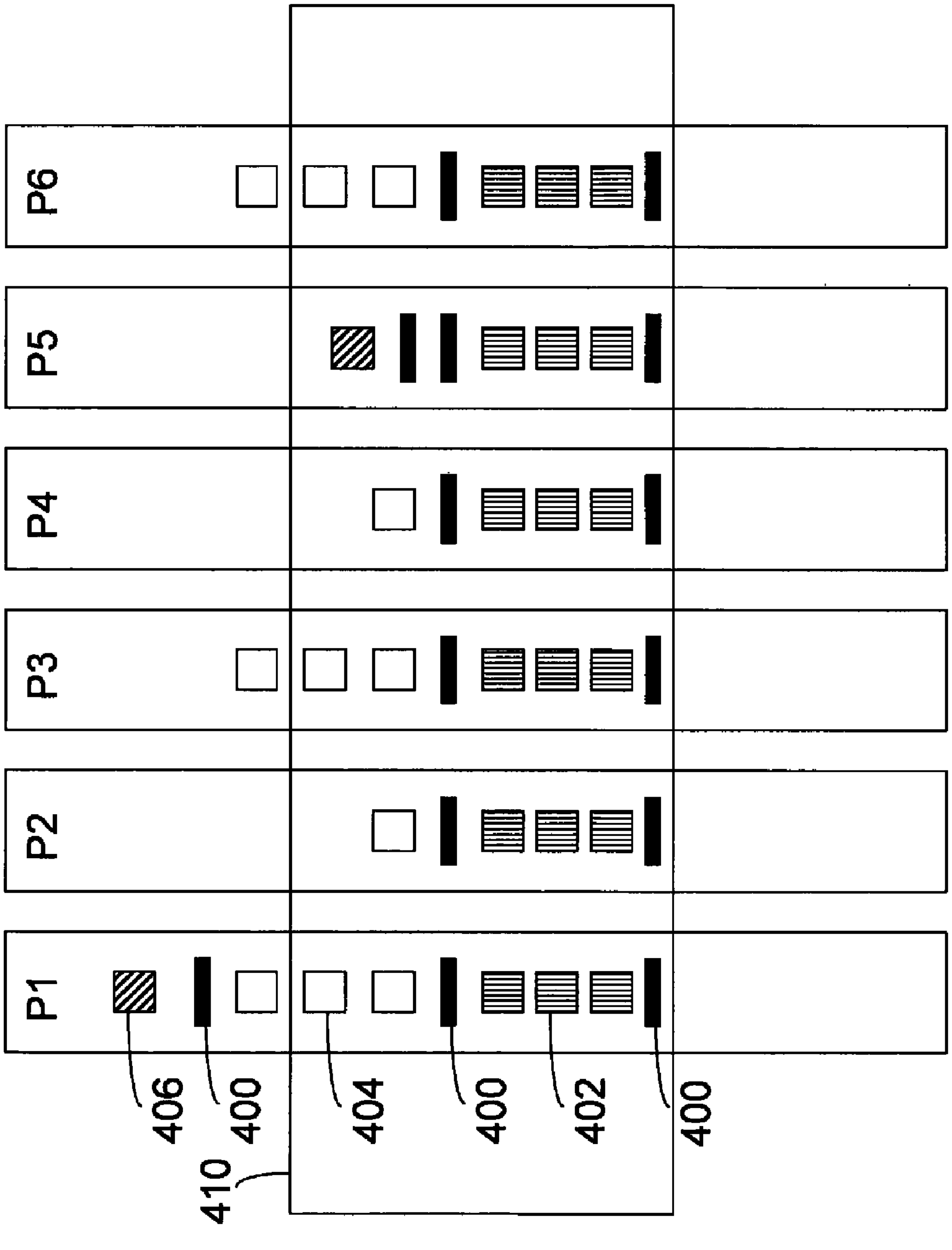
FIGS. 4-6 illustrate the parallel processing of batches of pixels in accordance with an embodiment of the invention.

These operations are more fully appreciated with reference to a specific example. FIG. 4 illustrates a set of six parallel processors P1-P6. In this example, batch tokens are indicated by the solid horizontal blocks 400. Pixels associated with a first batch 402 are marked with vertical lines, pixels from a second batch 404 are marked as plain boxes, and pixels from a third batch 406 are marked with diagonal lines. Observe that processor P5 has pixels from the first and third batch, but not the second batch (i.e., no open square tiles). The sequenced tiles may be viewed as pipelined operations or operations within a First-In-First-Out (FIFO) queue.

Any number of techniques may be used to demark each batch. For example, one or more flag bits associated with a pipeline transaction may be used to specify a batch boundary. Alternately, a special token may be inserted into the command or data stream to mark the start or end of a batch. Regardless of the technique used, the term batch token is used to indicate batch demarcation. Counters may be used anywhere in the graphics pipeline 118 to track the number of batches within each processor. The counter is incremented each time a batch token is received.

As shown in FIG. 4, the distributor circuit (202 of FIG. 2) distributed individual pixel location information 402 of the first batch to each of the individual processors P1-P6. One technique for determining that a batch has been completely read is to require that at least two batch tokens exist in each processor P. In this embodiment, batch tokens are monitored at two points in a processor P: (1) immediately after the reads have been performed and (2) immediately before the writes are performed (i.e., immediately before leaving the processors and being directed to the raster operations units 208 for the writes). When two batch tokens are detected in each pipe, the pixels associated with the bottom most batch are popped.

In the example of FIG. 4, each processor P includes at least two different batch tokens, indicating that the work for the oldest batch has been completed. Therefore, the pixels associated with the oldest batch are popped from the set of processors. In particular, the pixels are delivered to the raster operations units 208. In turn, the raster operations units 208 may perform write operations, in any order, to selected memory locations within the frame buffer 130.

FIG. 4 illustrates the concept of a corral. In FIG. 4, the corral 410 is a specified portion of the processing pipeline of the set of processors P1 through P6. In particular, each processor has an entry point and an exit point that demarks the boundary of the corral. In the example of FIG. 4, the entry point is the point at which read data arrives at the processor and the exit point is the point at which data is released to the network 208 and raster operations units 206. Entry and exit points are uniformly positioned across the processors. As can be appreciated from this example, the corral may be viewed as a stationary structure through which data passes. The blit corral provides a way of circumscribing a collection of data and confirming that all data in a given batch is present. The corral contains an exit gate that prevents the unloading (writing) of blit data in a batch if the source data has not been fully read. Observe in FIG. 4 that the corral 410 contains data from three different batches 402, 404 and 406. The corral 410 must be large enough to contain at least one batch.

Figure 5:
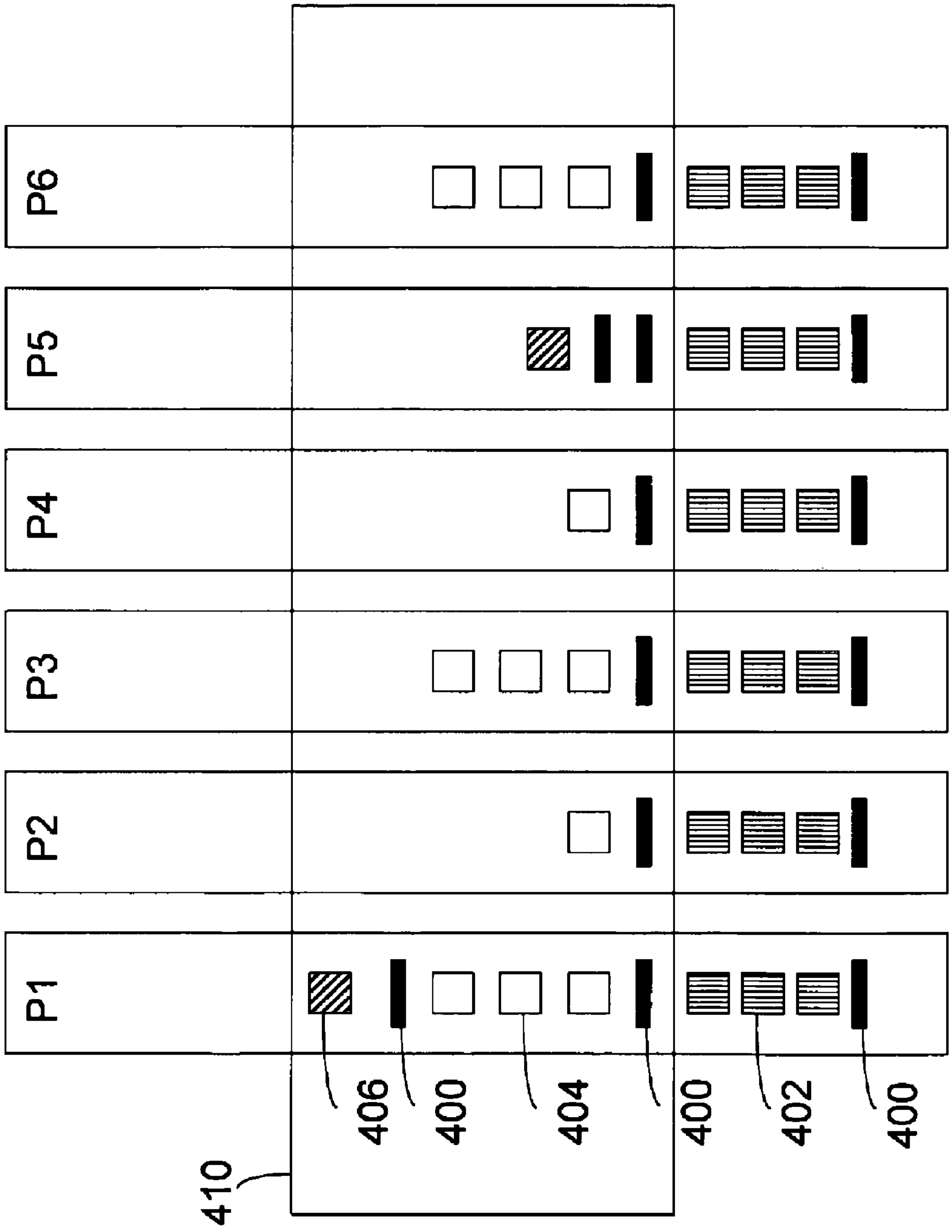
Figure 6:
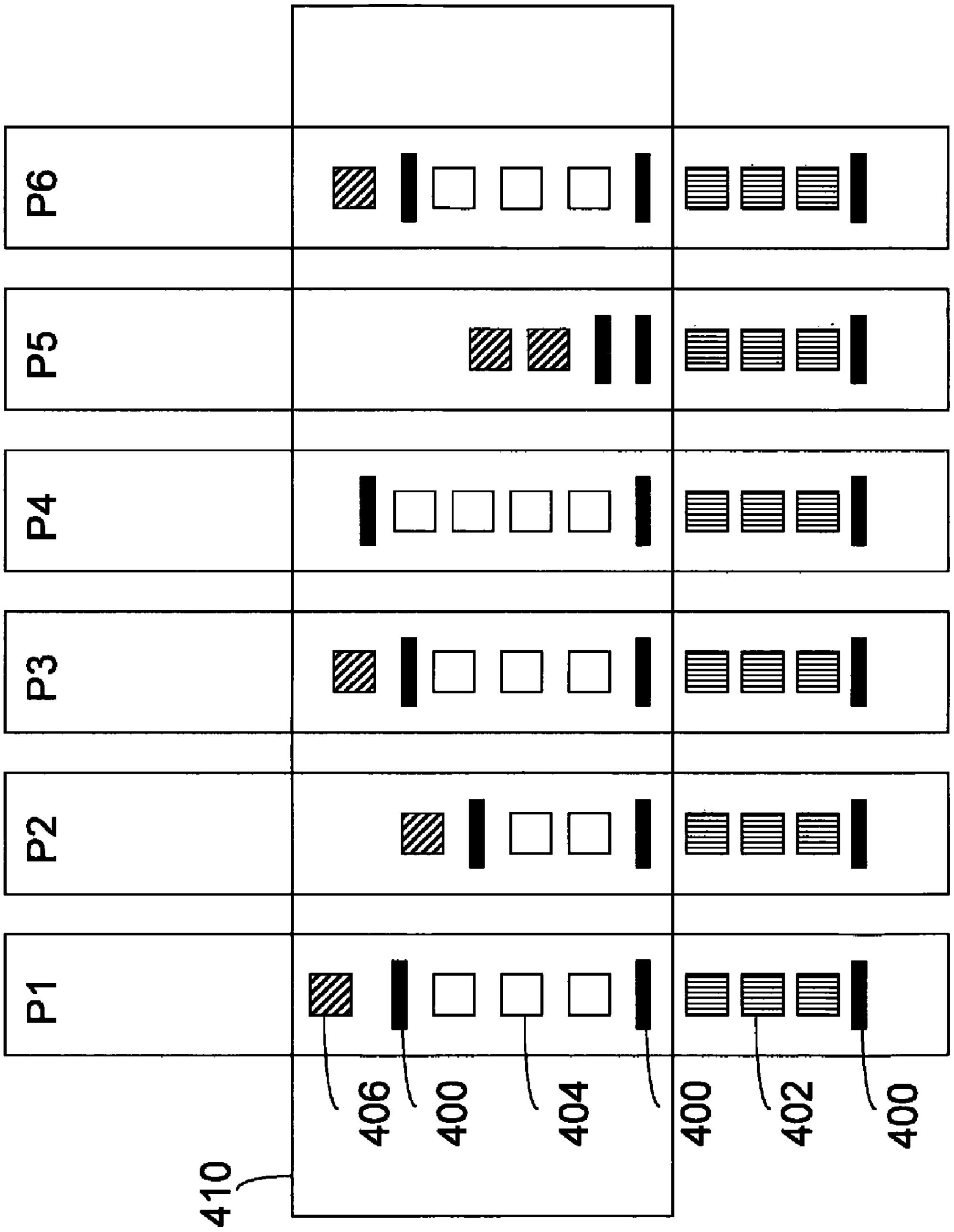

After the data associated with the first batch 402 is removed, the processor state of FIG. 5 results. At this point in time, processors P2, P3, P4 and P6 may only have a portion of the data from a single batch because only one batch token is present within the corral. Therefore, additional pixels cannot be popped if data integrity is to be maintained. The two-dimensional rasterizer 200 continues to deliver pixel information to the processors, resulting in the configuration shown in FIG. 6. At this point in time, each processor has at least two batch tokens. Observe that processor P4 has two batch tokens, but has not received data 406 from the third batch. Also observe that processor P5 has two batch tokens, but has not received any data 404 from the second batch. This illustrates the distributed nature of the processing in the system. Processing of batch data across the processors is not necessarily uniform. Each processor may not have the same amount of data in a given batch. This can occur, for example, when a batch lies at the edge of the blit rectangle. Indeed as shown in FIG. 6, there may be circumstances in which data for a batch is not processed by a processor of the set of processors. The processing of batch data across the processors does not have to be tightly synchronized. Any processor can perform reads ahead of the others, subject to buffering limitations in the blit corral. Similarly, once a batch is complete, data from that batch can be written by some processors earlier or later than others.

Since two batch tokens exist in each processor of FIG. 6, the pixels associated with the oldest batch (i.e., the second batch 404) may once again be released for processing by the raster operations units 208.

The corral driver 114 may be configured to allow a user to specify a desired batch size. The corral driver 114 may also be used to disable the corral processing operations, for example by disabling any batch tokens when the source and destination rectangles are known not to overlap.

Those skilled in the art will appreciate that the invention provides a technique for performing blit operations in a parallel processor environment. This is achieved through blit data grouping in the form of batches. The invention provides a minimally invasive coherent protocol that avoids data corruption hazards. Thus, the invention allows one to perform same surface blits without write-before-read corruption.

An embodiment of the present invention relates to a computer storage product with a computer-readable medium having computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs, DVDs and holographic devices; magneto-optical media; and hardware devices that are specially configured to store and execute program code, such as application-specific integrated circuits ("ASICs"), programmable logic devices ("PLDs") and ROM and RAM devices. Examples of computer code include machine code, such as produced by a compiler, and files containing higher-level code that are executed by a computer using an interpreter. For example, an embodiment of the invention may be implemented using Java, C++, or other object-oriented programming language and development tools. Another embodiment of the invention may be implemented in hardwired circuitry in place of, or in combination with, machine-executable software instructions.

The foregoing description, for purposes of explanation, used specific nomenclature to provide a thorough understanding of the invention. However, it will be apparent to one skilled in the art that specific details are not required in order to practice the invention. Thus, the foregoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

The invention claimed is:

1. A method of processing graphics information in a parallel processing system, comprising:

for a blit operation including copying of a source pixel area to a destination pixel area, dividing pixels associated with the blit operation into a first batch and a second batch with each batch being a subset of the blit input data;

determining whether the source pixel area overlaps with the destination pixel area;

based on determining that the source pixel area overlaps with the destination pixel area, activating a corral for the blit operation;

delivering pixels of the first batch and the second batch to parallel processors, wherein the parallel processors include the corral defined by entry points and exit points distributed across the parallel processors, such that each of the parallel processors includes a respective entry point and a respective exit point demarking a boundary of the corral, the exit points of the corral preventing the release of pixels for a particular batch for writing prior to confirming that all reads for the particular batch have been completed to guarantee that all read operations for the batch occur before write operations;

identifying when all of the pixels of the first batch have been delivered to the corral; and removing the pixels of the first batch from the corral in response to said identifying.

2. The method of claim 1 further comprising performing data writes associated with the pixels of the first batch to complete the blit operation.

3. The method of claim 2 wherein performing data writes associated with the pixels of the first batch includes performing data writes in any order.

4. The method of claim 1 further comprising performing data reads associated with a batch in any order.

5. The method of claim 1 further comprising specifying a batch size; and configuring a size of the corral in accordance with the batch size so as to contain at least the pixels of the first batch.

* * * * *